United States Patent [19]

Sato et al.

[11] 3,961,360
[45] June 1, 1976

[54] SYNCHRONIZING DETECTOR CIRCUIT

[75] Inventors: Mitsuya Sato, Kokubunji; Yozo Tanihara; Makoto Furihata, both of Kodaira, all of Japan

[73] Assignee: Hitachi, Ltd., Japan

[22] Filed: Sept. 9, 1974

[21] Appl. No.: 504,364

[30] Foreign Application Priority Data
Sept. 7, 1973  Japan............................ 48-100180

[52] U.S. Cl.............................. 358/27; 328/133; 329/50; 307/232
[51] Int. Cl.² .................... H04N 9/50; H03D 3/18; H03D 13/00
[58] Field of Search.................... 358/23, 26, 27; 307/232, 235 R, 235 A, 235 H; 329/50; 328/133, 134, 166, 165

[56] References Cited
UNITED STATES PATENTS

| | | |
|---|---|---|
| 3,610,955 | 10/1971 | Blaser ................................. 358/27 |
| 3,730,989 | 1/1973 | Rhee ........................... 178/69.5 TV |
| 3,735,150 | 5/1973 | Harris ................................. 328/133 |
| 3,863,080 | 1/1975 | Steckler.............................. 328/133 |

*Primary Examiner*—George H. Libman
*Assistant Examiner*—John C. Martin
*Attorney, Agent, or Firm*—Craig & Antonelli

[57] ABSTRACT

In a synchronizing detector circuit which has at least two differential transistors, a pair of constant current transistors are connected to the differential transistors, and an output transistor is connected to the junctures between the differential and constant current transistors and to a filter circuit for detection. A synchronizing detector circuit comprises a compensating circuit incorporated between the junctures and the filter circuit and includes a constant current absorbing circuit, so as to prevent an offset output voltage of the filter circuit due to noise.

11 Claims, 3 Drawing Figures

SYNCHRONIZING DETECTOR CIRCUIT

BACKGROUND OF THE INVENTION

1. Field of the Invention

The present invention relates to a synchronizing detector circuit. More particularly, it relates to an ACC (automatic color signal gain control) detector circuit or a killer detector circuit in a color television circuit.

2. Description of the Prior Art

In order to reproduce stable color pictures irrespective of the field intensity of the color broadcast and to stably discriminate between a color broadcast and a black-and-white broadcast, it is desired in an ACC detector circuit or a killer detector circuit that the relationship between the amplitude voltage of a color burst signal and the ACC voltage or the killer voltage have good linearity. It is also desired that a change in the ACC voltage or the killer voltage caused by the change of the color burst signal be large. Further, since, at present, the above type of circuit has generally been constructed of a semiconductor integrated circuit, it is desirable that the number of detecting RC filters of the above circuit be small because the semiconductor integrated circuit should preferably have a small number of externally mounted terminals and components.

For an ACC detector circuit or a killer detector circuit, a synchronizing detector circuit has been developed by the applicants of the present application and is described in Japanese Patent Application No. 122509/1972 entitled "Synchronizing Detector Circuit".

This synchronizing detector circuit is shown in FIG. 3. In series with a constant current transistor $Q_1$ which is controlled by a synchronizing pulse is a symmetrical differential circuit for effecting full-wave rectification. A constant current transistor circuits is connected in series with the differential circuit. In the symmetrical differential circuit, transistors $Q_4$, $Q_5$ and transistors $Q_6$, $Q_7$, which are respectively connected in differential form, are connected to the respective collectors of transistors $Q_2$ and $Q_3$. The connection between the differential circuit and the constant current circuit is made such that the collectors of transistors $Q_4$ and $Q_6$ of the different sets of differential transistors are connected to the constant current transistor $Q_8$, while the collectors of the transistors $Q_5$ and $Q_7$ are connected to the transistor $Q_9$. An output transistor $Q_{10}$ is connected to the circuitry of the above arrangement in such a manner that its base is connected to the juncture between the constant current transistor $Q_9$ and the differential transistors $Q_5$ and $Q_7$, while its emitter is connected to the juncture between the other transistor $Q_8$ of the constant current circuit and the differential transistors $Q_4$ and $Q_6$. The collector of the output transistor $Q_{10}$ is connected to a filter circuit composed of a resistor R and a capacitor C.

In this circuit, the portion enclosed by broken lines in the figure is formed as a semiconductor integrated circuit. Thus, an externally mounted terminal 1 is applied with a supply voltage $V_{CC}$, terminal 2 is connected to the filter circuit, terminal 3 is a synchronizing pulse input terminal, terminal 4 is supplied with a chroma signal having a color burst signal, and terminal 5 is an input terminal for a subcarrier signal.

The circuit arrangement also includes bias resistances of the transistors and resistances inserted for stably operating the transistors. Since they are self-explanatory to those skilled in the art, an explanation thereof is omitted.

In operation, a synchronizing pulse is derived from a horizontal synchronizing signal through, for example, a delay circuit, so as to be synchronized with the color burst signal. In the circuit, therefore, only when the synchronizing pulse is present, does the transistor $Q_1$ operate, and a current based on the constant current characteristic of the transistor $Q_1$ flows. Accordingly, the chroma signal at that time corresponds only to the color burst signal portion. Then, the differential circuit receives the two inputs of the color burst signal and the subcarrier signal in phase with and having the same frequency as the color burst signal, and provides an output proportional to the color burst signal. In addition, the color burst signal is compared in phase with the subcarrier signal and is distinguished from a noise signal.

Such an operation is carried out as a so-called full-wave rectification of the color burst signal as stated below. During the positive half cycle of the color burst signal, the transistor $Q_3$ becomes conductive and the transistor $Q_2$ becomes nonconductive, so that an output from the transistors $Q_6$ and $Q_7$ is obtained. On the other hand, during the negative half cycle of the color burst signal, the state is the converse to the above, and the transistor $Q_2$ becomes conductive and the transistor $Q_3$ becomes nonconductive, so that an output from the transistors $Q_4$ and $Q_5$ is obtained.

Since, the circuit employs constant current circuit transistors $Q_8$ and $Q_9$ as the load circuit of the synchronizing detector circuit and the base-emitter circuit of the output transistor $Q_{10}$ is connected to the constant current circuit, the gain of the ACC voltage (also the killer voltage) can be made high relative to the burst input signal, and a sufficiently great ACC voltage (killer voltage) can be produced even from the single RC filter circuit.

Moreover, the base input of the output transistor $Q_{10}$ is received from the juncture between the constant current transistor and the differential transistors, while the emitter input is received from the other similar juncture constituting a pair with the above-mentioned juncture. Therefore, the output voltage of the transistor $Q_{10}$ supplied through its collector to the load filter circuit is as explained below.

When the alternating amplitude of the color burst signal $V_{BUR}$ is 0 volts, equal currents flow through the differential circuits, and the input current of the output transistor $Q_{10}$ becomes zero, so that the output $V_{out}$ becomes 0 volts. When the color burst signal $V_{BUR}$ is sufficiently large, the maximum value of the output voltage $V_{out}$ becomes $V_{CC} - V_{BE8} - V_{CE10(sat)}$, and is substantially equal to the supply voltage $V_{CC}$.

Consequently, according to the above circuit, the ACC voltage or the killer voltage varies linearly approximately over a range of 0 volts $-V_{CC}$ volts depending on the variation of the alternating amplitude of the color burst signal as illustrated at $l_1$ in FIG. 2, and outputs having large amounts of change can be produced. As a result, the ACC circuit or the killer circuit which is driven by this circuit is operated efficiently.

As the externally mounted component, one RC filter circuit suffices. Therefore, where the above circuit is constructed as a semiconductor integrated circuit, the numbers of the externally mounted terminals and components can be made small. With this proposed circuit, the various effects described above should be expected.

However, when the circuit was actually fabricated and operated, it was revealed that, as shown by a broken line $l_2$ in FIG. 2, a so-called offset voltage $V_{os}$ arises, particularly during the reception of a weak field, because the ACC voltage or the killer voltage does not decrease with the lowering of the color burst signal. Needless to say, however, the output of the proposed circuit is satisfactory in comparison with the output of the above referred to synchronizing detector circuit (not provided with the output transistor $Q_{10}$) as shown by a one-dot chain line $l_3$ in the figure. (Refer to Japanese Patent Application No. 122509/1972).

The cause of the offset voltage $V_{os}$ was studied, and the following has been discovered.

In the previous explanation of operation, noise signals were assumed to be perfectly eliminated by synchronous detection. In actuality, however, some noise signals asynchronous with the phase of the color subcarrier of 3.58 MHz cannot be eliminated. On the other hand, the output is obtained from the output transistor $Q_{10}$. In the circuit of FIG. 3, noise components can flow only in the direction of the arrows by the rectifying function of the base-emitter junction of the output transistor 210. Therefore, the noise component cannot flow in a direction opposite to the arrows. Accordingly, only the positive components of the noise (negative components in some circuit arrangements) are fed via the output transistor $Q_{10}$ to the R-C filter circuit, to give rise to the offset voltage $V_{os}$.

SUMMARY OF THE INVENTION

The present invention has been made in order to solve the problem stated above. An object of the present invention is to provide a synchronizing detector circuit which does not peak-detect noise during the reception of a weak field.

The fundamental construction of the present invention for accomplishing this object consists of a synchronizing detector circuit which comprises at least two transistors connected in differential form, a constant current circuit composed of a pair of transistors respectively connected to the collectors of the differential transistors and an output transistor having its base connected to one of the junctures between the differential transistors and the constant current circuit and its collector connected to a filter circuit, a first signal being applied to the base of one transistor of the differential transistors, a second signal being applied to emitters thereof, the synchronizing detector circuit being characterized in that a compensating transistor is provided which has a base connected to the other of said junctures between said differential transistors and said constant current circuit and which has a collector connected to a constant current absorbing circuit, whereby an offset voltage of said filter circuit due to noise is prevented by said constant current absorbing circuit.

DETAILED DESCRIPTION OF THE INVENTION

Hereunder the present invention will be concretely described along an embodiment with reference to the accompanying drawings.

Figure 1:
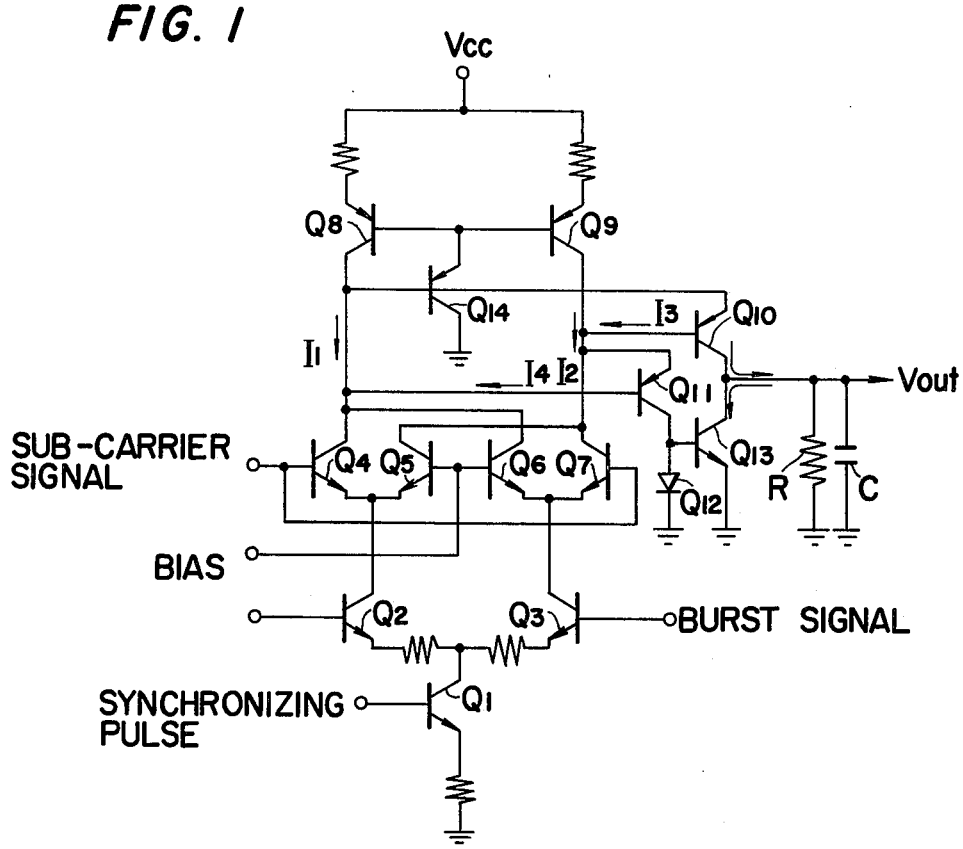
FIG. 1 is a circuit diagram showing an embodiment of the synchronizing detector circuit according to the present invention.

FIG. 1 illustrates a synchronizing detector circuit embodying the present invention. As is shown in the figure, in series with the constant current transistor $Q_1$ which is controlled by the synchronizing pulse, the symmetrical differential circuit (the transistors $Q_2$–$Q_7$) for effecting full-wave rectification is connected. In series with the differential circuit, the constant current circuit (the transistors $Q_8$ and $Q_9$) is connected so that the constant current circuit operates as a load circuit of the symmetrical differential circuit. The output of this circuit is passed through the output transistor $Q_{10}$ the base of which is connected to the juncture between the constant $Q_9$ and the differential transistors $Q_5$ and $Q_7$ and the emitter of which is connected to the juncture between transistor $Q_8$ and the differential transistors $Q_4$ and $Q_6$. The collector signal of the output transistor $Q_{10}$ is fed to the filter circuit composed of the resistance R and the capacitor C, to produce the output. In the circuit arrangement thus far described, a compensating transistor $Q_{11}$ is provided. As opposed to the case of the output transistor $Q_{10}$, the compensating transistor $Q_{11}$ has its base connected to the collector of transistor $Q_8$ and has its emitter connected to the side of the collector of transistor $Q_9$. The collector signal of the compensating transistor $Q_{11}$ is applied to a constant current absorbing circuit which consists of a transistor $Q_{13}$ including a diode-connected transistor $Q_{12}$ in its base circuit. The collector of the transistor $Q_{13}$ is connected to the filter circuit.

Figure 2:
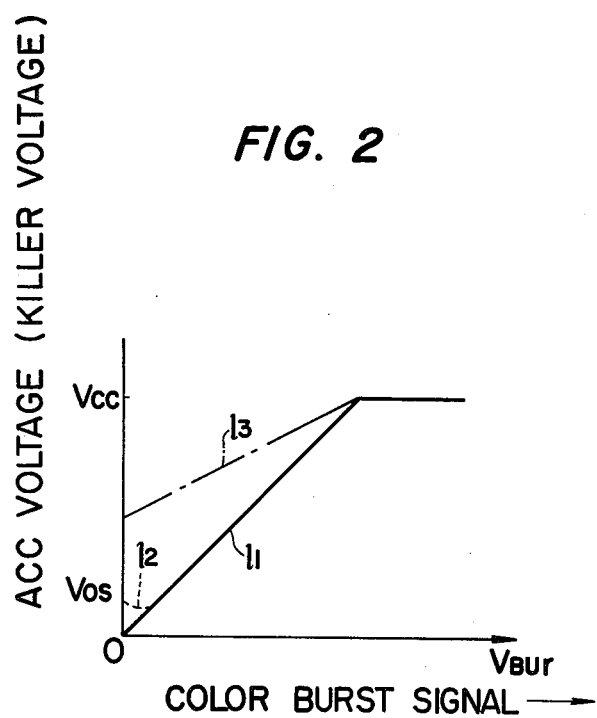
FIG. 2 shows output characteristics of synchronizing detector circuits.
Figure 3:
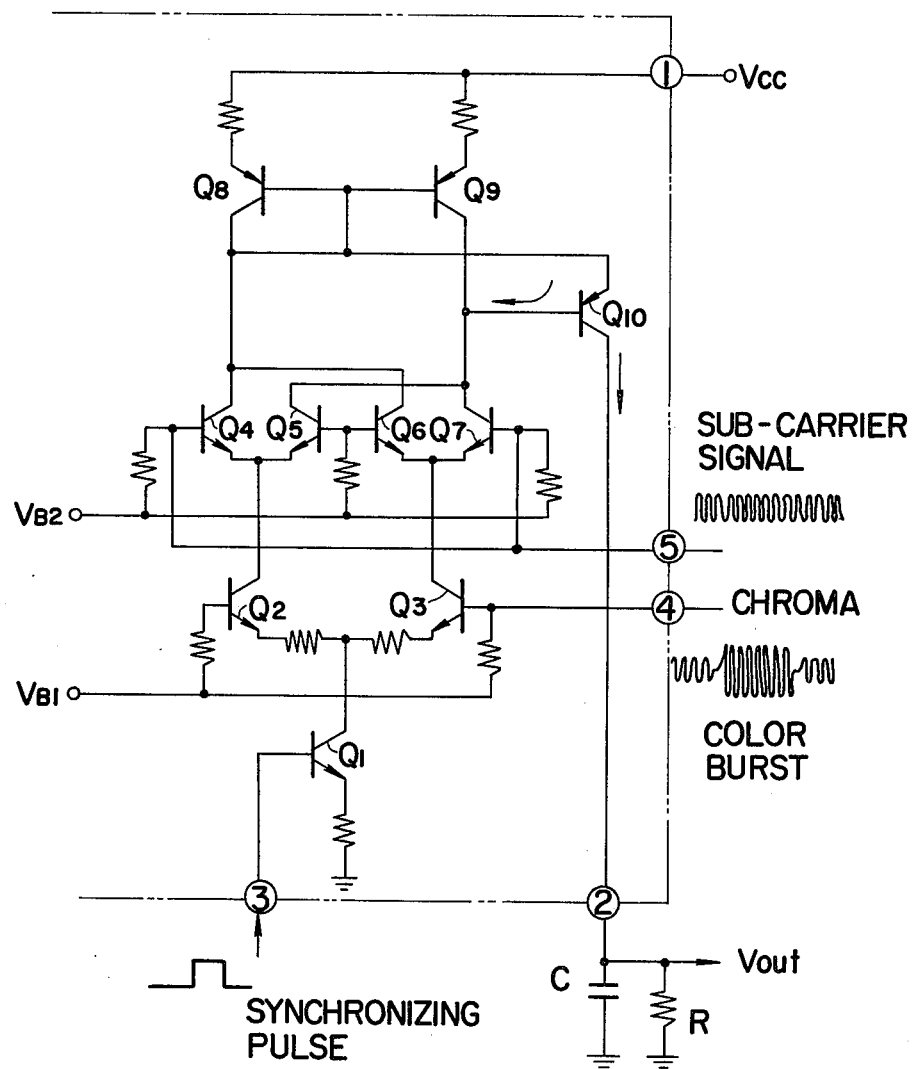
FIG. 3 is a circuit diagram showing a synchronizing detector circuit which has been previously proposed by the applicant of the present application.

According to the circuit of the above construction, a signal representative of the difference between synchronized detection currents $I_1$ and $I_2$ as shown in the figure, that is, currents of $h_{FE10}$ ($I_2 - I_1$) from the output transistor $Q_{10}$ and $h_{FE11}$ ($I_1 - I_2$) from the compensating transistor $Q_{11}$ flow through the filter circuit as to the noise during weak field reception. Since both the positive component and the negative component of the noise is applied, no offset voltage is generated, and an output characteristic $l_1$ of good linearity illustrated in FIG. 2 is attained.

On the other hand, during normal field intensity, the amplitude voltage of the color burst signal is large, so that $I_2 > I_1$. Accordingly, $I_3 = I_2 - I_1 > 0$, while $I_4 = I_1 - I_2 < 0$. For this reason, the compensating transistor $Q_{11}$ is cut off, and the constant current absorbing circuit provided for the filter circuit exerts no influence on the output $V_{out}$.

A transistor $Q_{14}$ is provided for by-passing the base currents of transistors $Q_8$ and $Q_9$ to ground potential so that the quiescent current $I_1$ is approximately equal to the collector current of $Q_9$.

The present invention is not restricted to the foregoing embodiment, but it can adopt various aspects of performance. For example, the constant current absorbing circuit may be of a different circuit arrangement. In the case of a synchronizing detector circuit in which the output transistor $Q_{10}$ has its emitter connected to the power supply terminal $V_{CC}$, the compensating transistor $Q_{11}$ may also have its emitter connected to the power supply terminal $V_{CC}$. Further, even when the differential circuit is a circuit which effects half-wave rectification, the present invention can be similarly employed.

The present invention is not restricted to an ACC detector circuit or a killer detector circuit for color television, but it is applicable to general synchronizing detector circuits.

While we have shown and described several embodiments in accordance with the present invention it is understood that the same is not limited thereto but is susceptible of numerous changes and modifications known to a person skilled in the art and we therefore do not wish to be limited to the details shown and described herein but intend to cover all such changes and modifications as are obvious to one of ordinary skill in the art.

For purposes of simplification, transistors $Q_1$ through $Q_7$ and $Q_{13}$ will be identified as transistors of the first conductivity type, (i.e., NPN), while the remaining transistors will be identified as transistors of the second conductivity type (i.e., PNP). It is to be understood that transistors $Q_1$ through $Q_7$ and $Q_{13}$ do not have to be NPN transistors in order for the invention to be operable. It is merely necessary that they be of a conductivity opposite to that of the remaining transistors.

What is claimed is:

1. In a synchronizing detector circuit which includes:
   at least two differentially connected first conductivity type transistors;
   a constant current circuit composed of a pair of second conductivity type transistors having their collectors respectively connected to the collectors of the differentially connected transistors, their bases connected to each other, and their emitters connected to a supply voltage;
   a filter; and
   a second conductivity type output transistor having its base connected to a juncture between one of the said differentially connected transistors and one of the transistors of said constant current circuit and its collector connected to said filter circuit;
   a first signal being applied to the base of one of the said differentially connected transistors, and a second signal being applied to the emitters thereof;
   the improvement comprising:
   means connected between the other of the junctures between the second of said differentially connected transistors and the other of the transistors of said constant current circuit and said filter circuit for preventing the occurrence of an offset voltage in said filter circuit due to noise.

2. The improvement according to claim 1, wherein said means comprises:
   a second conductivity type compensating transistor the base of which is connected to said other juncture between the second of the said differentially connected transistors and the other of the transistors of said constant current circuit, and
   a constant current absorbing circuit comprising a first conductivity type transistor having its collector connected to said filter circuit, its base connected to the collector of said compensating transistor and its emitter connected to a reference potential, and a diode means connected between the base and the emitter of said transistor.

3. The improvement according to claim 2, wherein the emitter of said output transistor is connected to the base of said compensating transistor and the emitter of said compensating transistor is connected to the base of said output transistor.

4. The improvement according to claim 2, further comprising a second conductivity type by-pass transistor connected between each of the transistors of said constant current circuit and a source of reference potential having its emitter connected to the bases of the pair of transistors in said constant current circuit, its base connected to said first juncture and its collector connected to said reference potential.

5. The improvement according to claim 2, wherein said constant current absorbing circuit comprises a transistor, the collector of which is connected to one side of said filter circuit, the base of which is connected to the collector of said compensating transistor and the emitter of which is connected to the other side of said filter circuit, and a diode connected between the base and emitter of the transistor of said constant current absorbing circuit.

6. The improvement according to claim 3, wherein said constant current absorbing circuit comprises a transistor, the collector of which is connected to one side of said filter circuit, the base of which is connected to the collector of said compensating transistor and the emitter of which is connected to the other side of said filter circuit, and a diode connected between the base and emitter of the transistor of said constant current absorbing circuit.

7. The improvement according to claim 6, further comprising a second conductivity type by-pass transistor connected between each of the transistors of said constant current circuit and a source of reference potential having its emitter connected to the bases of the pair of transistors in said constant current circuit, its base connected to said first juncture and its collector connected to said reference potential.

8. The improvement according to claim 2, wherein said first signal is a sub-carrier color signal and said second signal is a color burst signal.

9. The improvement according to claim 4, wherein said first signal is a sub-carrier color signal and said second signal is a color burst signal.

10. The improvement according to claim 7, wherein the emitter of said by-pass transistor is connected to the base of each of the respective transistors of said constant current load circuit, the base of said by-pass transistor is connected to said one juncture and the emitter of said by-pass transistor is connected to said source of reference potential.

11. The improvement according to claim 10, wherein said first signal is a sub-carrier color signal and said second signal is a color burst signal.

* * * * *